United States Patent [19]
Cameron

[11] Patent Number: 5,572,097
[45] Date of Patent: Nov. 5, 1996

[54] METHOD AND APPARATUS FOR STARTING POLYPHASE DC MOTOR

[75] Inventor: Scott W. Cameron, Phoenix, Ariz.

[73] Assignee: SGS-Thomson Microelectronics, Inc., Carrollton, Tex.

[21] Appl. No.: 275,645

[22] Filed: Jul. 15, 1994

Related U.S. Application Data

[63] Continuation of Ser. No. 843,824, Feb. 28, 1992, abandoned, which is a continuation-in-part of Ser. No. 770,576, Oct. 3, 1991, Pat. No. 5,221,881.

[51] Int. Cl.$^6$ .................................................... H02K 23/00
[52] U.S. Cl. ........................................... 318/254; 318/439
[58] Field of Search .................................... 318/138, 254, 318/439

[56] References Cited

U.S. PATENT DOCUMENTS

| | | | |
|---|---|---|---|
| 4,484,114 | 11/1984 | Ebbs | 318/254 |
| 4,616,166 | 10/1986 | Cooper et al. | 318/712 |
| 4,678,973 | 7/1987 | Elliot et al. | 318/254 |
| 4,748,387 | 5/1988 | Tanuma et al. | 318/254 |
| 4,808,893 | 2/1989 | Cavanagh | 318/254 |
| 4,835,448 | 5/1989 | Dishner et al. | 318/254 |
| 4,922,169 | 5/1990 | Freeman | 318/254 |
| 5,017,845 | 5/1991 | Carobolante et al. | 318/138 |
| 5,159,246 | 10/1992 | Ueki | 318/254 |
| 5,198,733 | 3/1993 | Wright | 318/254 |
| 5,221,881 | 6/1993 | Cameron | 318/138 |
| 5,306,988 | 4/1994 | Carobolante et al. | 318/254 |
| 5,343,127 | 8/1994 | Maiocchi | 318/254 |
| 5,350,984 | 7/1994 | Carobolante et al. | 318/254 |

Primary Examiner—David S. Martin
Attorney, Agent, or Firm—Richard A. Bachand; Joseph C. Arrambide; Lisa K. Jorgenson

[57] ABSTRACT

In a method for aligning a rotor of a polyphase dc motor in preparation for starting the motor, a first energization signal is applied to field coils of the motor in a first predetermined phase for a first predetermined time. Then, a second energization signal having a second predetermined phase displaced from the first phase by a predetermined amount is applied to the field coils for a second predetermined time period. In one embodiment, the second energization signal is applied to produce a maximum torque upon the rotor when the rotor is positioned at a location determined by the first energization signal. In the case of a three phase motor, the second energization signal is displaced by two commutations from the first energization signal. Circuitry for aligning a rotor of a polyphase dc motor in preparation for startup is also presented having circuitry for applying a first signal to selected field coils of the polyphase dc motor having a first commutative phase for a first predetermined time, and circuitry for applying a second signal to other selected field coils of the polyphase dc motor having a second commutative phase for a second predetermined time.

19 Claims, 4 Drawing Sheets

FIELD PATTERN

1

METHOD AND APPARATUS FOR STARTING POLYPHASE DC MOTOR

CROSS-REFERENCE TO RELATED APPLICATION

This is a continuation of application Ser. No. 07/843,824 filed Feb. 28, 1992, now abandoned, which is a continuation-in-part of application Ser. No. 07/770,576, filed Oct. 3, 1991, now U.S. Pat. No. 5,221,881, issued Jun. 22, 1993, said application being incorporated herein in its entirety by reference.

BACKGROUND OF THE INVENTION

1. Field of the Invention

This invention relates to improvements in methods, apparatus, and circuitry for starting polyphase motors, and more particularly, to improvements in methods and circuitry for aligning a rotor of a polyphase dc motor to a position that will assure the rotor will synchronously rotate upon motor startup.

2. Description of the Prior Art

Although the present invention pertains to polyphase dc motors, in general, it finds particular application in conjunction with three phase dc motors, particularly of the brushless, sensorless type which are used for rotating data media of the type found in computer related applications, such as hard disk drives, CD ROM drives, floppy disks, and the like. In such computer applications, three phase brushless, sensorless dc motors are becoming popular, due to their reliability, low weight, and accuracy.

Motors of this type can typically be thought of as having a stator with three stator coils connected in a "Y" configuration, although actually, a larger number of stator coils are usually employed with multiple rotor poles. Typically, in such applications, eight pole rotors, with four N-S magnetic sets, are used, having twelve stator windings. A typical motor arrangement of this type is shown in FIG. 1. Such motor results in having four electrical cycles per revolution of the rotor. The stator coils, however, can be analyzed in terms of three "Y" connected coils, connected in three sets of four coils, each physically separated by 90°, typical coil interconnections being illustrated in FIG. 2.

In three phase operation, the coils are energized in sequences in each of which a current path is established through two coils of the "Y", with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction in the coil which was included in the prior current path. In this manner, six commutation sequences are defined for each electrical cycle in a three phase motor. These six sequences are shown in the example in FIG. 3, described in TABLE A below:

TABLE A

| Phase | Current Flows From: | To: | Floating Coil: |
|---|---|---|---|
| 1 | A | B | C |
| 2 | A | C | B |

TABLE A-continued

| Phase | Current Flows From: | To: | Floating Coil: |
|---|---|---|---|
| 3 | B | C | A |
| 4 | B | A | C |
| 5 | C | A | B |
| 6 | C | B | A |

In the past, during the operation of a such motor, and of polyphase dc motors, in general, it has been recognized that maintaining a known position of the rotor is an important concern. There have been various ways by which this was implemented. The most widely used way, for example, has been to start the motor in a known position, then develop information related to the instantaneous or current position of the rotor. One source of such instantaneous position information has been developed as a part of the commutation process, and involved identifying the floating coil, and monitoring its back emf, that is, the emf induced into the coil as it moves through the magnetic field provided by the stator.

When the voltage of the floating coil crossed zero (referred to in the art as "a zero crossing"), the position of the rotor was assumed to be known. Upon the occurrence of this event, the rotor coil commutation sequence was incremented to the next phase, and the process repeated. The assumption that the zero crossing accurately indicated the rotor position was generally true if the motor was functioning properly, and nothing had occurred which would disturb its synchronization from its known startup position. However, in actual operation, events did occur which often resulted in a loss of synchronization. Such loss of synchronization might occur, for example, if the rotation of the disk was interrupted by a physical bump, or by a stick motor bearing, or by frictional losses in the disk carrier, and so on. And, once such loss of synchronization occurred, there was no recovery.

The possibility of loss of synchronization made the motors previously used vulnerable and delicate, and great care had to be taken to insure that the startup algorithms and running conditions were precisely controlled to avoid anything which might cause such out of synchronization condition to occur.

In a traditional startup technique for brushless and sensorless motor drivers, the rotor of the motor was aligned statically to a known phase prior to initiation of a startup algorithm that controlled the energization signals to the rotor such that synchronism was maintained as the rotor was spun up to operating speed. The initial alignment was typically done by energizing the field coils of the motor with a certain predetermined phase signal for a predetermined amount of time. At the end of the time, the rotor of the motor theoretically would respond by positioning itself to the fields established by the signal applied to the field coils. Thereafter, assuming the rotor properly moved itself to the desired startup position, a startup algorithm could be successfully applied to bring the rotor up to speed in proper synchronism with the commutated signals applied to the field coils.

Occasionally, however, the rotor assumes an initial position, for example, in alignment with a magnetic field vector established by the field coils, or 180° from the magnetic field vector, so that the magnetic field vector can establish no torque capable of moving the rotor to the desired or correct aligned position. Thus, when the initial "align" phase is applied to the field coils, the rotor does not move to the desired startup position, and, when the startup algorithm is applied, the rotor is not properly positioned for startup. This results in unreliable startup, or a startup that is not properly synchronized.

More particularly, when a particular coil sequence is energized in a static "align" condition in preparation to motor startup, a particular magnetic field is established by the stator windings. An "AB" connection is illustrated in FIG. 4a, the arrows adjacent the various coils in the current path, denoted by the dotted line, indicating the direction of the magnetic fields established by the respective coils. The magnetic field information is condensed in the drawing of FIG. 4b.

Thus upon startup, in the past, one of the commutation sequences was temporarily energized, such as the "AB" phase, setting up the magnetic fields, as shown in FIGS. 4a and 4b. The rotor normally aligns to the field, as shown in FIG. 5. The rotor position shown in FIG. 5 with respect to the particular magnetic field established by the "AB" phase is known as a "stable zero torque position". The torque on the rotor created by the magnetic fields within the motor is zero, and if the rotor is attempted to be moved either clockwise or counterclockwise the torque on the rotor due to the influences of the magnetic fields increase, tending to restore the rotor to the stable zero torque position shown. Moreover, the further the rotor is rotated from the stable zero torque position, the greater the torque attempting to restore the rotor to the original position. When, however, the rotor reaches a position mechanically displaced 45° (in the case of an eight pole motor) from the stable zero torque position (one of such positions being shown in FIG. 6), another zero torque position is reached. Just past this zero torque position, known as an "unstable zero torque position", the magnetic forces tend to pull the rotor to the next stable zero torque position 90° from the first.

At the 45° unstable zero torque position shown in FIG. 6, the torque on the rotor is virtually zero, and the rotor can exist essentially in equilibrium. In this position, the torque on the rotor is attempting to pull the rotor to each of the stable torque positions 45° forward and backward from the unstable torque position, so, at startup, if the rotor happens to be in this position, no rotation occurs when the coils are energized. Since no rotor alignment movement occurs, this can result in the rotor being in an unexpected position on startup, resulting in a loss of synchronization when the commutation sequences are subsequently applied to the rotor. This condition may be further exacerbated by frictional forces of the motor bearings, the sticking forces of the head to the disk (in disk drive applications), and so on. Thus, if the rotor is at or near an unstable zero torque position, the possibility of it not moving to the stable zero torque position may be fairly significant, since the torque experienced by the rotor is at minimum or zero values at this particular location.

SUMMARY OF THE INVENTION

In light of the above, it is, therefore, an object of the invention to provide an improved method and apparatus for starting a polyphase DC motor.

It is another object of the invention to provide an improved method and apparatus for aligning the rotor of a polyphase DC motor to a known starting position in preparation for applying commutated drive signals to the field windings of the motor in operation.

It is another object of the invention to provide an improved method and apparatus for assuring that the rotor of a motor is actually moved to the desired startup position.

These and other objects, features and advantages of the invention will be apparent to those skilled in the art from the following detailed description of the invention, when read in conjunction with the accompanying drawings and appended claims.

In accordance with the invention, a double align startup rotor position technique is presented. The technique employs two align periods. The first align period applies a first phase to the field coils of the motor that would align the rotor of the motor to a known position, in a fashion similar to that employed in the prior art. Then, the rotor may or may not be in the desired startup position, depending upon its relationship with the magnetic field vector established by the field coils of the motor in response to the phase of the startup energy applied to them. Then, a second phase signal is applied to the field coils that establishes a magnetic field vector that is displaced from the initially established magnetic field vector. For example, in a three-phase motor, the second magnetic field vector may be displaced by approximately 120°. This will bring the rotor of the motor to a second start position. Thus, for example, if the motor did not respond to the first phase signal applied to the field coils, it must respond to the second phase signal, since it is displaced from the first, and can not be such that the rotor will align with a zero torque inducing magnetic field vector. On the other hand, if the rotor did respond to the first phase signal, it will also respond to the second phase signal. In this manner, the rotor is virtually guaranteed to align to the correct startup phase by the end of the align cycle, thereby greatly increasing the reliability of the startup.

In accordance with a broad aspect of the invention, a method for aligning a rotor of a polyphase dc motor in preparation for starting the motor is presented. In accordance with the method, a first energization signal is applied to field coils of the motor in a first predetermined phase for a first predetermined time. Then, a second energization signal having a second predetermined phase displaced from the first phase by a predetermined amount is applied to the field coils for a second predetermined time period. In one embodiment, the second energization signal is applied to produce a maximum torque upon the rotor when the rotor is positioned at a location determined by the first energization signal. In the case of a three phase motor, the second energization signal is displaced by two commutations from the first energization signal.

In accordance with another broad aspect of the invention, circuitry for aligning a rotor of a polyphase dc motor in preparation for startup is presented. The circuitry includes circuitry for applying a first signal to selected field coils of the polyphase dc motor having a first commutative phase for a first predetermined time, and circuitry for applying a second signal to other selected field coils of the polyphase dc motor having a second commutative phase for a second predetermined time.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENT

Figure 1:
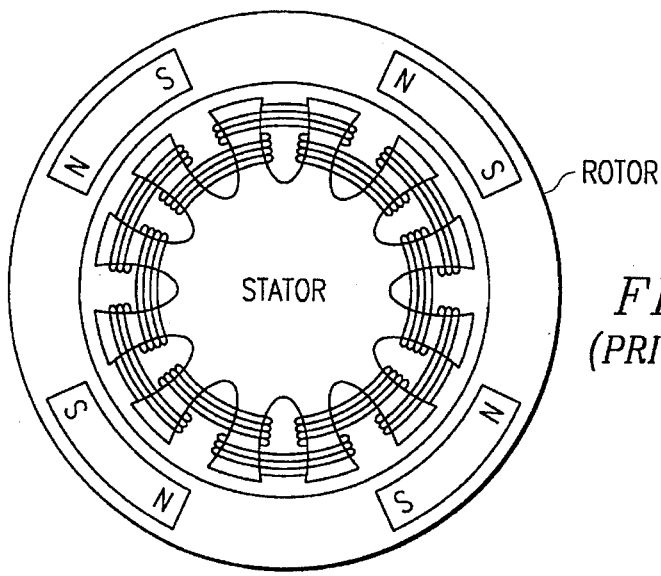
FIG. 1 is an diagrammatic illustration of a typical arrangement of a motor having an eight pole rotor, with four N-S magnetic sets with which the method and apparatus of the invention can be employed.
Figure 2:
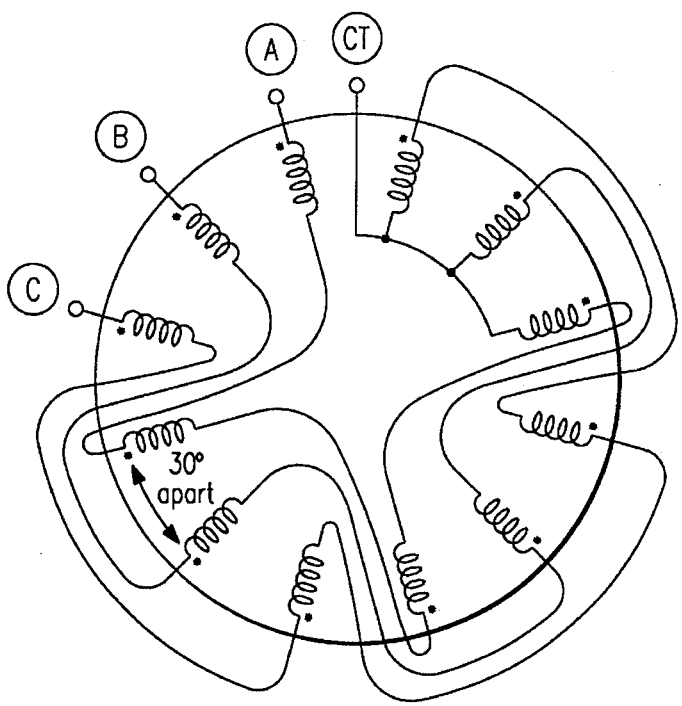
FIG. 2 is an electrical diagram showing one way in which the stator coils of the motor of FIG. 1 are typically interconnected to realize three "Y" connected coils, connected in three sets of four coils, each physically separated by 90°.
Figure 3:
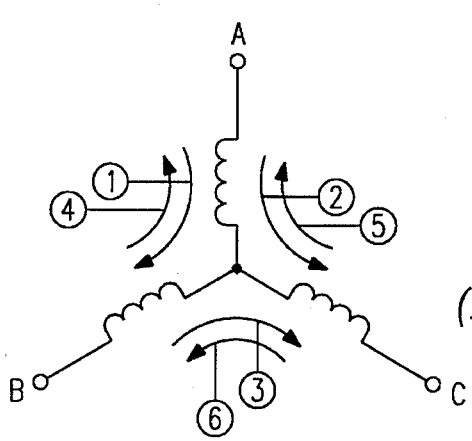
FIG. 3 is an electrical schematic diagram of an equivalent circuit of "Y" connected stator coils of the motor arrangement of FIG. 2, showing the six commutative sequences existing during operation.
Figure 4A:
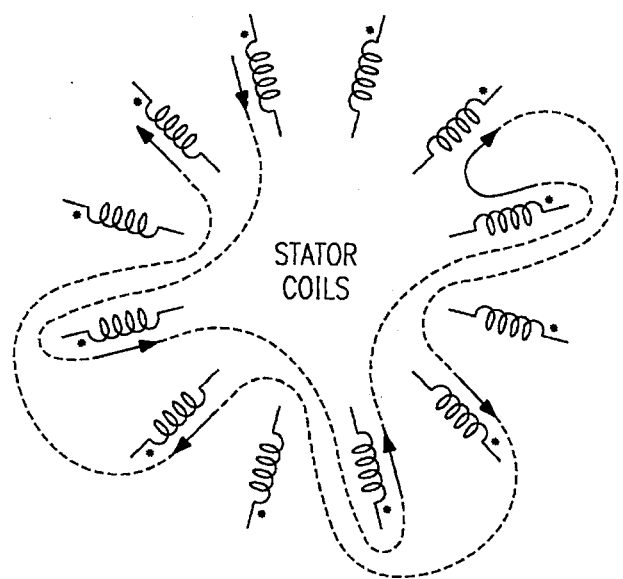
FIGS. 4a and 4b show the particular magnetic fields established an "AB" phase stator winding energization applied to the motor of FIG. 1.
Figure 4B:
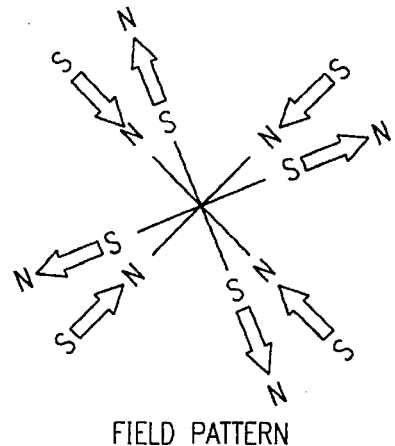
Figure 5:
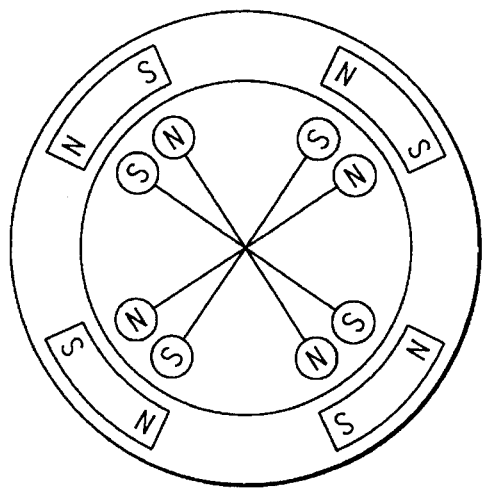
FIG. 5 is the expected static "stable zero torque position" alignment of the rotor to an "AB" phase stator winding energization applied to the motor of FIG. 1.
Figure 6:
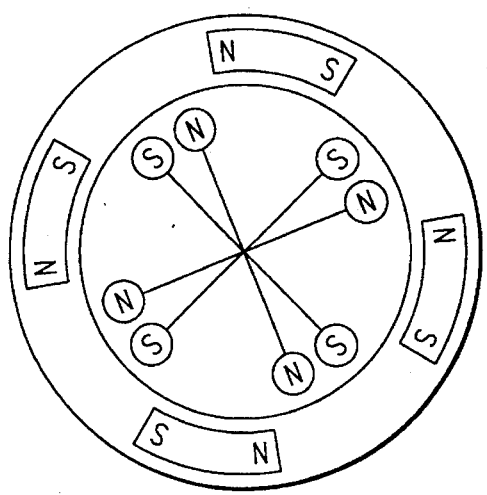
FIG. 6 is a motor diagram showing an unstable zero torque position" alignment or the rotor to an "AB" phase stator winding energization applied to the motor of FIG. 1.
Figure 7:
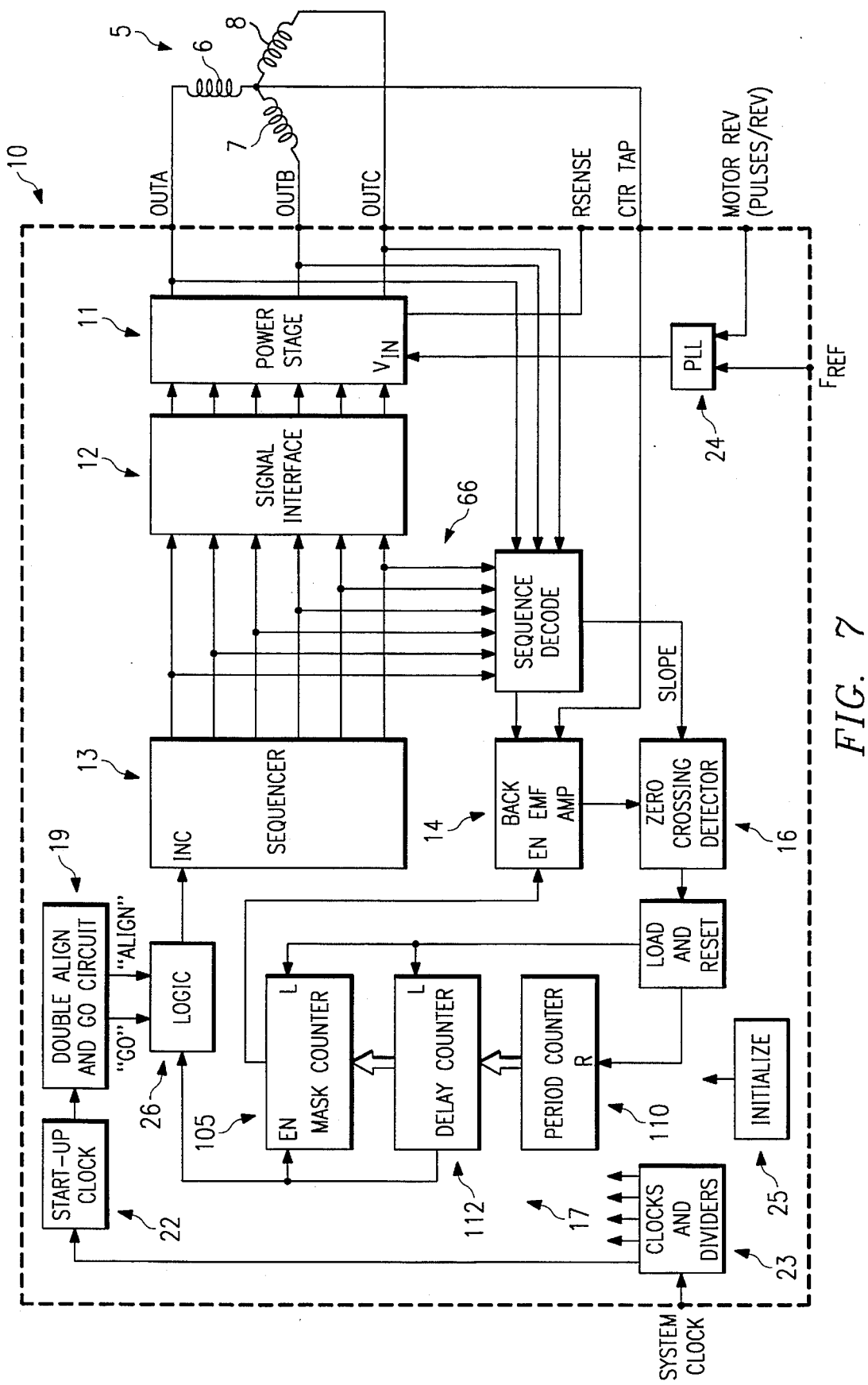
FIG. 7 is an electrical schematic block diagram of a motor driver system incorporating circuitry for aligning the rotor of the motor to a known position prior to startup, in accordance with a preferred embodiment of the invention.

A portion of an electrical schematic block diagram of a motor controller circuit 10 in which the apparatus and method in accordance with a preferred embodiment of the invention may be incorporated is shown in FIG. 7. Although the motor controller can be constructed of discrete components, preferably, the motor controller circuit 10 is integrated onto a single semiconductor chip, represented by the dotted line encircling the motor controller circuitry, adapted for connection to the stator or field coils 5 of a three phase dc brushless spindle motor (not shown), for use, for example, to turn a magnetic or other disk (not shown) in systems such as computer hard disk drives, cd-rom drives, floppy disk drives, and the like. Such 3-phase motor preferably has Y connected stator windings 6, 7, and 8, although such Y configured winding connections are not essentially required. Preferably, although not necessarily, the motor employs twelve field windings and eight rotor poles that are conventionally arranged and connected. As mentioned above, the windings can be analyzed simply as three "Y" connected windings, as shown in FIG. 3. The windings 6, 7, and 8 are connected to output terminals OUT A, OUT B, OUT C and CTR TAP, of the motor control circuitry as below described in further detail.

It should be noted that although a preferred embodiment of the invention is described with particular regard to a three phase motor, the principles of the invention can be equally advantageously applied generally to polyphase motors, and to motors having different numbers of poles. Moreover, the motor driver circuit arrangement described is only one illustration of a motor driver circuit with which the rotor startup positioning circuitry of the invention can be used.

The driving voltages are provided to the stator windings 6, 7, and 8 from the output terminals OUT A, OUT B, and OUT C by a power stage 11, which may be configured as described in said above referenced copending patent application Ser. No. 770,576. The power stage 11 is controlled to provide sequential control output signals to the output terminals OUT A, OUT B, and OUT C in response to signals developed by a sequencer circuit 13 via a signal interface circuit 12 that supplies the output signals from the sequencer circuit 13 to the power stage 11, as well as enabling other functions, such as brake and output enable functions. In addition, the sequencer 13 also provides drive and sequence signals on an "internal commutation bus" 66 to other circuits of the controller circuitry to control the various aspects of rotation of the motor driven by the circuit 10. Details of the signal interface circuit 12 and sequencer 13 and their respective operations are also described in said above referenced copending patent application Ser. No. 770,576.

The output terminals OUT A, OUT B, and OUT C are also switchably connected to a back-emf sense amplifier 14, which in turn delivers signals to a zero crossing detector circuit 16. The zero crossing detector circuit 16 provides input signals to a digital delay circuit 17, which has an output that controls the operation of the sequencer 13. Details of the back-emf sense amplifier 14, zero crossing detector circuit 16, and digital delay circuit 17 and their respective operations are also described in said above referenced copending patent application Ser. No. 770,576. The motor controller circuitry 10 also includes system clock circuitry 23, phase lock loop (PLL) frequency/phase detector circuitry 24, and initialize circuitry 25. In accordance with a preferred embodiment of the invention, the circuitry 10 also includes "double align and go" start up circuitry 19 to facilitate start up of the motor from a stopped condition.

As mentioned, the switching of the driver transistors of the power stage 11 to effect the switching currents for each phase is accomplished by the sequencer circuit 13 which provides signals through the interface circuit 12 to accomplish the commutative switching sequence to operate the motor. More specifically, the sequencer circuit 13 has a shift register (not shown) and associated logic circuitry that determines which ones of the various coils 6, 7, and 8 are activated at any particular instant. The shift register data is shifted by application of an increment signal to the "INC" input terminal; in normal operation, the shift register is clocked by an increment signal introduced into the shift register from a delay counter 112.

The commutation among the coils 6, 7, and 8 is performed in response to information indicating the specific unambiguous position of the rotor of the motor in conjunction with circuit information indicating the desired position of the rotor. More specifically, the commutation to apply the successive sequences is determined in response to a corresponding coil reaching a particular rotational position and its correlation with sequencer information indicating where the motor should be at a particular time prior to when a commutation is to occur. The determination of the precise rotational location of the rotor is continuously being updated by monitoring the zero crossing voltage in the successive non-driven, or floating, coils. More particularly, as the coils 6, 7, and 8 are switched during the commutation sequence of the rotor, the voltages of the floating coils are monitored by the back emf amplifier circuit 14. In order to increment the sequencer 13 in normal operation, the actual position of the rotor 5 is determined by the back emf amplifier circuit 14 and zero crossing detector circuit 16 to operate the delay and mask circuitry 17.

During the operation of the motor, certain magnetic fields are established by the field or stator windings of the motor that cause the rotor to rotate. The magnetic fields are dynamic, and essentially rotate at a speed dependent upon a number of factors, including the frequency of the signals applied, the number of phases of the drive signal, the number of poles of the rotor, and the number of field winding poles. Depending upon the relative position of the rotor with respect to the instantaneous position of the magnetic field established by the field coils, different amounts of torque are experienced by the rotor. In fact, during normal operation, as the rotor moves from the influence of the magnetic field established by one pole of the field coils to the magnetic field established at a subsequent pole that will be encountered in its rotation, different amounts of torque are experienced. This phenomenon is referred to as "torque ripple", and is usually addressed by increasing the number of poles of the field winding as well as the number of phases of the frequency signal applied to the field coils.

At startup, the rotor may be at virtually any random position with respect to the field coils. Depending upon the exact position, the amount of torque that is applied to the rotor is dependent upon the relative position of the rotor to the magnetic field vector established by the field coil windings, and may vary between a range from zero to maximum torque.

It will be appreciated that if the rotor at startup is located at or near one of the unstable zero torque positions by virtue of the relative position of the rotor with respect to the magnetic field established by the field windings, the rotor may move slightly, or not at all. On the other hand, it has been found that in a three-phase motor having multiple poles, if a second commutation and field coil energization cycle is performed, the rotor will be moved to a position at which it can be assured that a zero torque producing magnetic field does not exist. Still further, it has been found that in a three-phase motor having multiple poles, if a double commutation is performed to energize the second field coil following an initial align energization sequence, maximum torque is produced upon a motor rotor upon application of the start up sequence. That is, in a three-phase motor system, the maximum torque is applied by stepping the field coil drive signals through two commutation phases. Thus, for example, if the first static align commutation phase that is energized is the "AB" phase, the second static align commutation phase that may be energized can be the "AC" phase. Similar considerations exist for other motor arrangements having polyphase driving signals in which a double align technique assures that the rotor is not at a zero torque position, and maximum torque can be applied to the rotor by applying field coil activation signals that are stepped an appropriate number of times.

Figure 8:
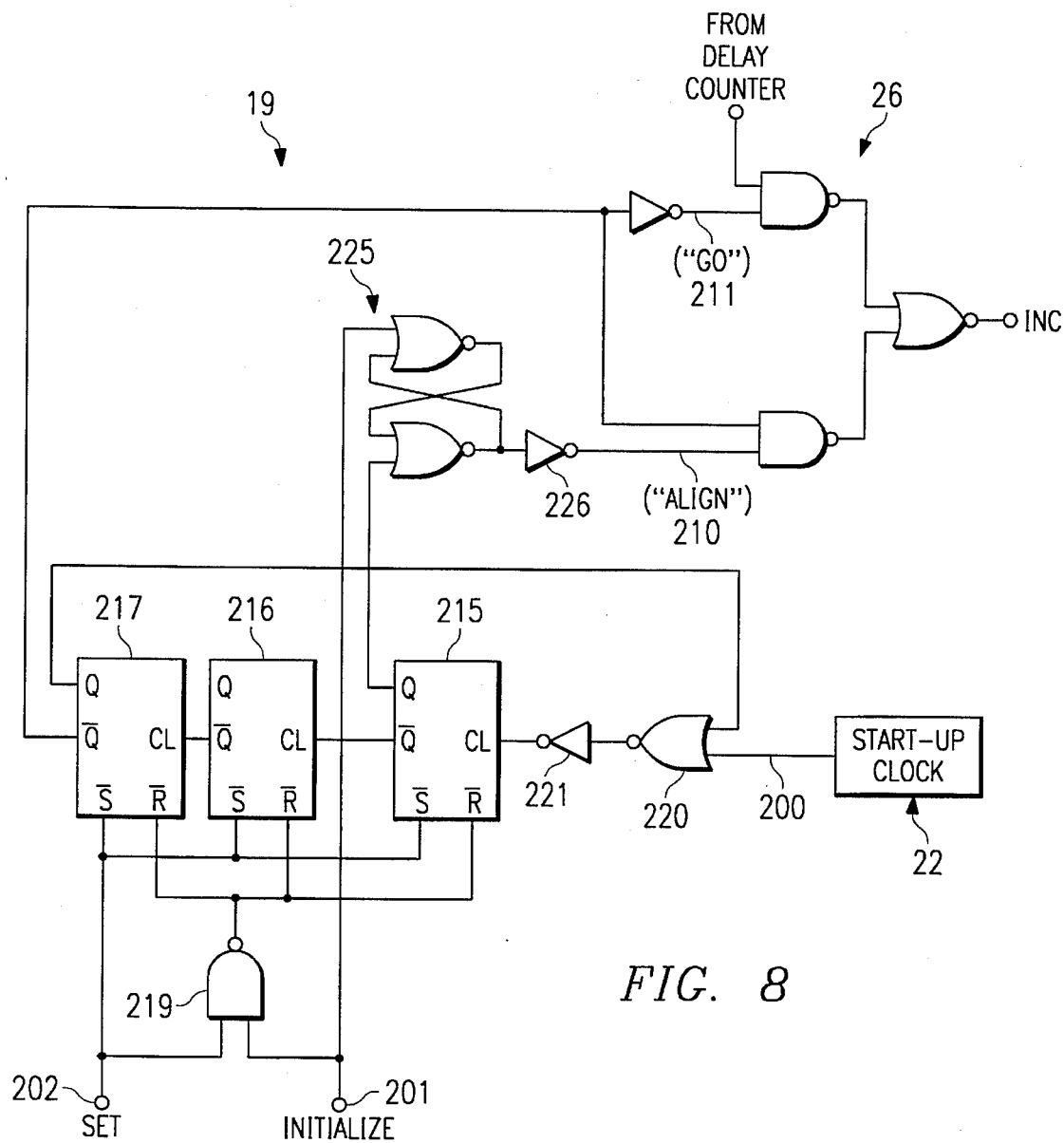
FIG. 8 is an electrical schematic diagram of a circuit for developing align and go signals in accordance with a preferred embodiment of the invention.

Thus, as shown in FIG. 8, "double align and go" circuitry 19 is provided that receives a startup clock signal on a node 200 from a start-up clock circuit 22, an initialize signal on an input node 201, and a set signal on an input node 202. The outputs from the circuit 19 are derived on an "align" node 210 and a "go" node 211. Three R-S flip-flops 215, 216, and 217 are provided. The "Q" output from the third R-S flip-flop 217 is compared with the startup clock signal appearing on the input node 200 by a NOR gate 220, and the compared signal is inverted by an invertor 221 to be applied to the clock input of the first R-S flip-flop 215. The "Q(bar)" output of the first R-S flip-flop 215 is connected to the clock input of the second R-S flip-flop 216. Similarly, the "Q(bar)" output of the second R-S flip-flop 216 is connected to the clock input of the third R-S flip-flop 217. The "Q" output of the first R-S flip-flop 215 is connected to the input of an output flip-flop 225 that develops an output applied to an invertor 226 from which the "align" output is derived on the output node 210.

In operation, the circuit 19 operates to produce two pulses on the "align" output node 210 in a response to the startup clock signal as it is initially applied to the input node 200. The R-S flip-flops 215, 216, 217, and 225 are initially reset by an initialize signal applied to input node 201. Thereafter, a set signal is applied to input node 202, to introduce set and reset signals into the R-S flip-flops 215, 216, and 217, whereby the set signal can be clocked through the respective flip flops by clock pulses that are developed as described below.

As the output on the "Q(bar)" terminal of the R-S flip-flop 217 is initially high, after application of the reset "initialize" signal to input node 210, the output pulses on the "align" output node 210 are initially applied via logic circuitry 26 to increment the sequencer circuitry 13, shown in FIG. 7. The two "align" signals are therefore applied in sequence to activate the field coil signals on the windings 5 of the motor. This causes the rotor of the motor to be double aligned, as described above. After the occurrence of the second pulse on the "align" signal, the "Q" output of the third flip-flop 217 is clocked to a high state, inhibiting the further passage of clock signals from the startup clock 22 applied to the input node 200 in the comparison by the comparator NOR gate 220.

After the R-S flip-flop 217 changes state, the "Q(bar)" output goes low, thereby inhibiting the passage of further align signals through the logic circuitry 26, but enabling the drive signals from a source of start up signals to be applied to increment the sequencer 13 to spin up the rotor of the motor. Until then, the "Q" output of the first R-S flip-flop 215 has changed states twice, thereby developing two "align" pulses on the node 210. The start up signals that can be applied may be provided by a circuit controlled in accordance with a start up algorithm, for example, such start algorithms being well known in the art. In the embodiment illustrated, as described in said above referenced copending patent application Ser. No. 770,576, which is capable of starting the motor directly from the output of the delay counter 112 due to the operation of the zero crossing detector to determine the actual rotor position as it is being energized, the output of the delay counter 112 may be used to start the rotor. Thus, the output from the delay counter is shown as being applied to the logic circuitry 26 in the circuit of FIG. 8.

It should be noted that although three R-S flip-flop circuits have been shown, the number can be changed to effect a different number of align pulses to increment the sequencer circuit a predetermined number of times, in order, for example, to apply maximum, or a predetermined, startup torque on the rotor.

Although the invention has been described and illustrated with a certain degree of particularity, it is understood that the present disclosure has been made by way of example only, and that numerous changes in the combination and arrangements of parts and features can be made by those skilled in the art without departing from the spirit and scope of the invention, as hereinafter claimed.

I claim:

1. An apparatus for starting a polyphase dc motor having a rotor, a stator, and commutation circuitry wherein the commutation circuitry comprises:

a start-up clock circuit having a clock output;

a double align and go circuit connected to the clock output and having an align output and a go output;

a logic circuit for receiving the align output and the go output, and having an increment output for generating an increment signal; and a sequencer circuit connected to said increment output for commutating a plurality of phases in said stator responsive to said increment signal.

2. The apparatus of claim 1 wherein said double align and go circuit comprises:

a plurality of logic gates; and a plurality of flip-flops for generating a sequence of align signals and a go signal.

3. The apparatus of claim 2 wherein said plurality of flip-flops comprise three clocked R/S flip-flops.

4. The apparatus of claim 2 wherein said plurality of logic gates comprises a least one nor gate for receiving said start-up clock signal.

5. The apparatus of claim 1 wherein said logic circuit comprises:

a first logic gate for receiving the go signal, and having a first output;

a second logic gate for receiving the align signal and for receiving an inverted go signal, and having a second output; and a third logic gate for receiving the first output of said first logic gate and the second output of said second logic gate, for generating an increment signal.

6. The apparatus of claim 5 wherein said first logic gate is a nand gate.

7. The apparatus of claim 5 wherein said second logic gate is an nand gate.

8. The apparatus of claim 5 wherein said third logic gate is a nor gate.

9. A brushless, polyphase, direct-current motor having a rotor, stator coils, a power stage for driving stator coils, a signal interface, and a start-up circuit wherein said start-up circuit comprises:

a start-up clock circuit having a clock output;

a double align and go circuit connected to the clock output, having an align output, and having a go output;

a logic circuit for receiving the align output and the go output, and having an increment output for generating an increment signal; and a sequencer circuit connected to said increment output for commutating a plurality of phases in said stator coils responsive to said increment signal.

10. The apparatus of claim 9 wherein said double align and go circuit further comprises:

a plurality of logic gates; and a plurality of flip-flops for generating a sequence of align signals and a go signal.

11. The apparatus of claim 10 wherein said plurality of flip-flops comprise three clocked R/S flip-flops.

12. The apparatus of claim 10 wherein said plurality of logic gates comprise a nor gate for receiving said start-up clock signal.

13. The apparatus of claim 9 wherein said logic circuit comprises a first logic gate for receiving a delay counter signal and for receiving the go signal, and having an output;

a second logic gate for receiving the align signal and for receiving an inverted go signal, and having an output; and a third logic gate for receiving the output of said first logic gate and the output of said second logic gate, for generating an increment signal.

14. The apparatus of claim 13 wherein said first logic gate is a nand gate.

15. The apparatus of claim 13 wherein said second logic gate is an nand gate.

16. The apparatus of claim 13 wherein said third logic gate is an nor gate.

17. A method for starting the rotation of a polyphase dc motor in a disk drive comprising the steps of:

generating a first align signal using a double align and go circuit to energize a first dual coil mode commutation phase;

generating a second align signal using the double align and go circuit to energize a second dual coil mode commutation phase; and generating a go signal using the double align and go circuit to enable a start-up algorithm for the normal commutation sequence to proceed.

18. The method of claim 17 wherein the step of generating a second align signal comprises energizing a predetermined phase whereby a maximum torque is created.

19. The method of claim 17 wherein the step of generating a second align signal comprises energizing a phase two commutation steps from said first phase.

* * * * *